US012632469B2

(12) United States Patent (10) Patent No.: US 12,632,469 B2
Mazzola Paluska et al. (45) **Date of Patent: *May 19, 2026**

(54) SEQUENTIAL CONSISTENCY ACROSS A DISTRIBUTED CLOUD COMPUTING NETWORK

(71) Applicant: Cloudflare, Inc., San Francisco, CA (US)

(72) Inventors: Justin Mazzola Paluska, Cambridge, MA (US); Joshua Tyler Howard, Atlanta, GA (US); Matthew Silverlock, New York City, NY (US); Kenton Taylor Varda, Austin, TX (US); Vy Nhuy Ton, New York, NY (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/005,664

(22) Filed: Dec. 30, 2024

(65) Prior Publication Data

US 2025/0307265 A1 Oct. 2, 2025

Related U.S. Application Data

(63) Continuation of application No. 18/740,932, filed on Jun. 12, 2024, now Pat. No. 12,182,167.

(Continued)

(51) Int. Cl.
*G06F 16/27* (2019.01)
*G06F 16/23* (2019.01)
(52) U.S. Cl.
CPC ........ *G06F 16/273* (2019.01); *G06F 16/2379* (2019.01)

(58) Field of Classification Search
CPC ........................... G06F 16/273; G06F 16/2379
See application file for complete search history.

(56) References Cited

U.S. PATENT DOCUMENTS

2017/0097972 A1* 4/2017 Zhou ..................... G06F 16/258
2018/0173745 A1 6/2018 Balasubramanian et al.
(Continued)

OTHER PUBLICATIONS

Bailis et al., Highly Available Transactions: Virtues and Limitations, 40th International Conference on Very Large Data Bases, Sep. 1-5, 2014, Hangzhou, China, Proceedings of the VLDB Endowment, vol. 7, No. 3, pp. 181-192.
(Continued)

*Primary Examiner* — Robert W Beausoliel, Jr.
*Assistant Examiner* — Mohammad S Bhuyan
(74) *Attorney, Agent, or Firm* — NICHOLSON DE VOS WEBSTER & ELLIOTT LLP

(57) ABSTRACT

Sequential consistency across a distributed cloud computing network is described. A database includes a primary database and multiple read replica databases. Write queries are transmitted to the primary database, and commit tokens are provided to the read replica databases and the clients. Commit tokens are included in requests from clients. If a request for a read operation received at a read replica database does not include a token that is later than a commit token of the most recent update to the read replica database, the read operation is served by the primary database. If a request for a read operation received at a read replica database includes a token that is later than a commit token of the most recent update to the read replica database, the read replica database delays servicing the read update until it receives an update from the primary database with an updated commit token.

20 Claims, 5 Drawing Sheets

Related U.S. Application Data

(60) Provisional application No. 63/572,850, filed on Apr. 1, 2024.

(56) References Cited

U.S. PATENT DOCUMENTS

| | | | |
|---|---|---|---|
| 2020/0145480 A1 | 5/2020 | Sohail et al. | |
| 2021/0034589 A1 | 2/2021 | Mathur | |
| 2021/0133186 A1* | 5/2021 | Jalali | G06F 21/6218 |
| 2023/0133608 A1 | 5/2023 | Kumar et al. | |

OTHER PUBLICATIONS

Viotti et al., Consistency in Non-Transactional Distributed Storage Systems, arXiv:1512.00168v4 [cs.DC], Apr. 12, 2016, 45 pages.
Lamport, How to Make a Multiprocessor Computer That Correctly Executes Multiprocess Programs, IEEE Transactions on Computers, vol. C-28, No. 9, Sep. 1979, pp. 690-691.
Notice of Allowance, U.S. Appl. No. 18/740,932, Aug. 22, 2024, 13 pages.

\* cited by examiner

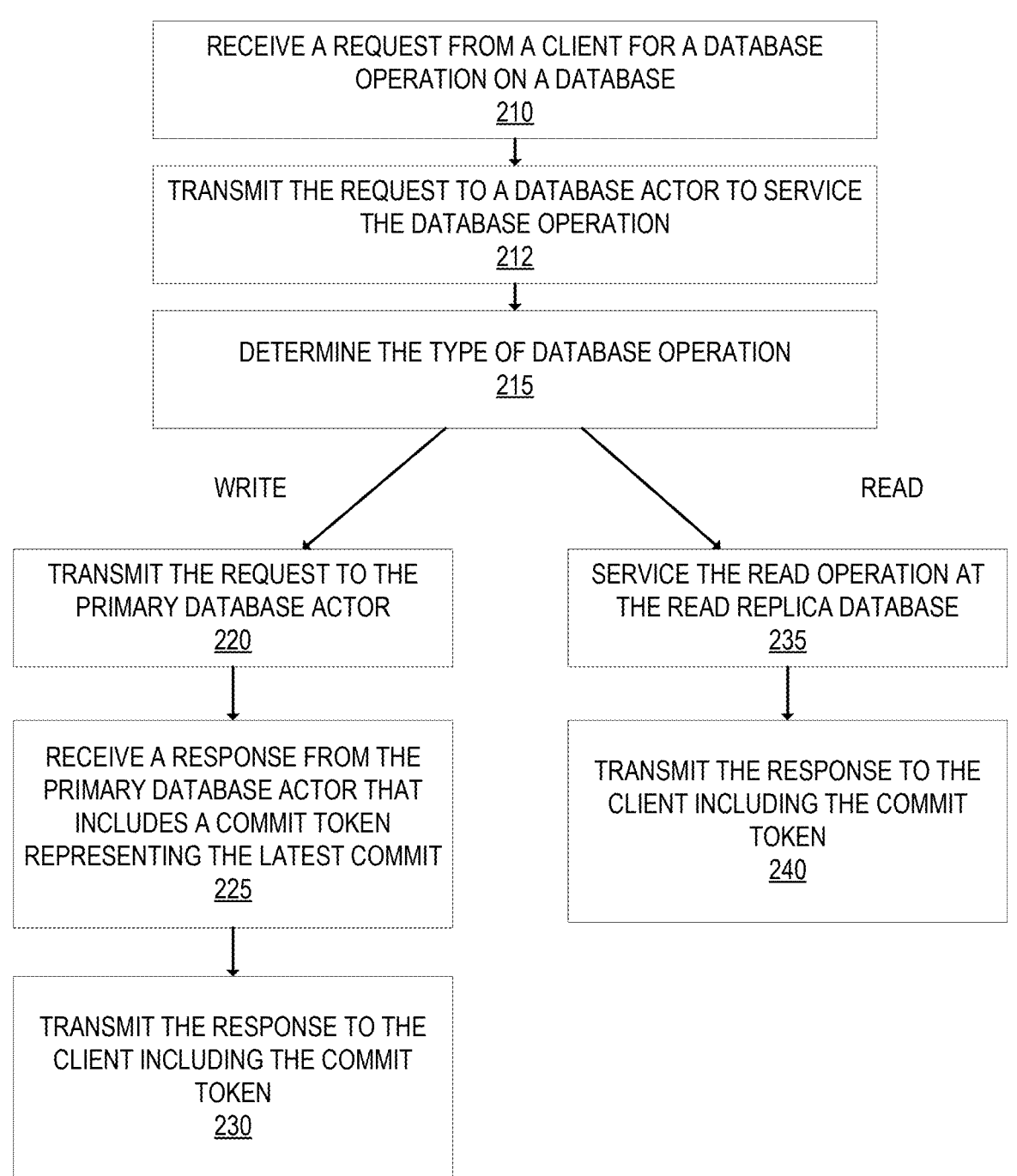

RECEIVE A REQUEST FROM A CLIENT FOR A DATABASE
OPERATION ON A DATABASE
210

TRANSMIT THE REQUEST TO A DATABASE ACTOR TO SERVICE
THE DATABASE OPERATION
212

DETERMINE THE TYPE OF DATABASE OPERATION
215

WRITE

READ

TRANSMIT THE REQUEST TO THE
PRIMARY DATABASE ACTOR
220

SERVICE THE READ OPERATION AT
THE READ REPLICA DATABASE
235

RECEIVE A RESPONSE FROM THE
PRIMARY DATABASE ACTOR THAT
INCLUDES A COMMIT TOKEN
REPRESENTING THE LATEST COMMIT
225

TRANSMIT THE RESPONSE TO THE
CLIENT INCLUDING THE COMMIT
TOKEN
240

TRANSMIT THE RESPONSE TO THE
CLIENT INCLUDING THE COMMIT
TOKEN
230

FIG. 2

SEQUENTIAL CONSISTENCY ACROSS A DISTRIBUTED CLOUD COMPUTING NETWORK

CROSS-REFERENCE TO RELATED APPLICATIONS

This application is a continuation of U.S. application Ser. No. 18/740,932, filed Jun. 12, 2024, which claims the benefit of U.S. Provisional Application No. 63/572,850, filed Apr. 1, 2024, which is hereby incorporated by reference.

FIELD

Embodiments of the invention relate to the field of distributed computing; and more specifically, to sequential consistency across a distributed cloud computing network.

BACKGROUND

In conventional server-based database management systems, a read replica is a separate database server that serves as a read-only, almost up-to-date copy of the primary database server. An administrator creates a read replica by starting a new server from a snapshot of the primary server and configuring the primary server to send updates asynchronously to the replica server. Since the updates are asynchronous, the read replica may be behind the current state of the primary server. The difference between the primary server and a replica is called replica lag. It is possible to have more than one read replica. Asynchronous read replication is a time-proven solution for improving the performance of databases. Asynchronous read replication may increase throughput by distributing load across multiple replicas, and may lower query latency when the replicas are close to the users making queries.

Most database systems provide read committed, snapshot isolation, or serializable consistency models, depending on their configuration. Stronger modes like snapshot isolation or serializable are easier to program against because they limit the permitted system concurrency scenarios and the kind of concurrency race conditions the programmer has to worry about.

Read replicas are updated independently, so each replica's contents may differ at any moment. If all queries go to the same server, whether the primary or a read replica, the results should be consistent according to which consistency model your underlying database provides. If using a read replica, the results may be a little old.

SUMMARY

Sequential consistency across a distributed cloud computing network is described. A database includes a primary database and multiple read replica databases. Write queries are transmitted to the primary database, and commit tokens are provided to the read replica databases and the clients. Commit tokens are included in requests from clients. If a request for a read operation received at a read replica database does not include a token that is later than a commit token of the most recent update to the read replica database, the read operation is served by the primary database. If a request for a read operation received at a read replica database includes a token that is later than a commit token of the most recent update to the read replica database, the read replica database delays servicing the read update until it receives an update from the primary database with an updated commit token.

BRIEF DESCRIPTION OF THE DRAWINGS

The invention may best be understood by referring to the following description and accompanying drawings that are used to illustrate embodiments of the invention. In the drawings:

FIG. 2 is a flow diagram that illustrates exemplary operations for providing sequential consistency across a distributed cloud computing network according to an embodiment.

DESCRIPTION OF EMBODIMENTS

Sequential consistency across a distributed cloud computing network is described. The distributed cloud computing network provides a serverless database service for use by its customers. The serverless database includes at least one primary database and a set of one or more read replica databases that are read replicas of the primary database. The set of read replica databases are typically distributed at different locations of the distributed cloud computing network. The serverless database implements sequential consistency. Implementing sequential consistency includes a Lamport timestamp (e.g., a monotonically increasing commit token) that is associated with each request to the database.

All write queries are sent to the primary database to ensure the total ordering of writes. The primary database transmits commit tokens to the replica databases. Commit tokens are sent to the clients. Read queries can be sent to any of the read replica databases. If a read replica database receives a request for a read operation with a commit token that is greater than the commit token for the most recent update to the read replica database, the read replica database delays servicing the read operation until it receives an update from the primary database with a commit token later than or equal to the commit token in the request. If a read replica database receives a request for a read operation without a commit token or with a commit token that is less than or equal to the commit token for the most recent update to the read replica database, the read replica database serves the read operation without delay.

Sequential consistency is applied to a logical session for a particular application, known herein as a session. A particular session encapsulates all queries for that application. As an example, a session may represent all queries received from one particular user agent (e.g., a particular web browser or a particular mobile application). A customer can design or configure their application so that each session sees a sequentially consistent view of their data.

Figure 1:
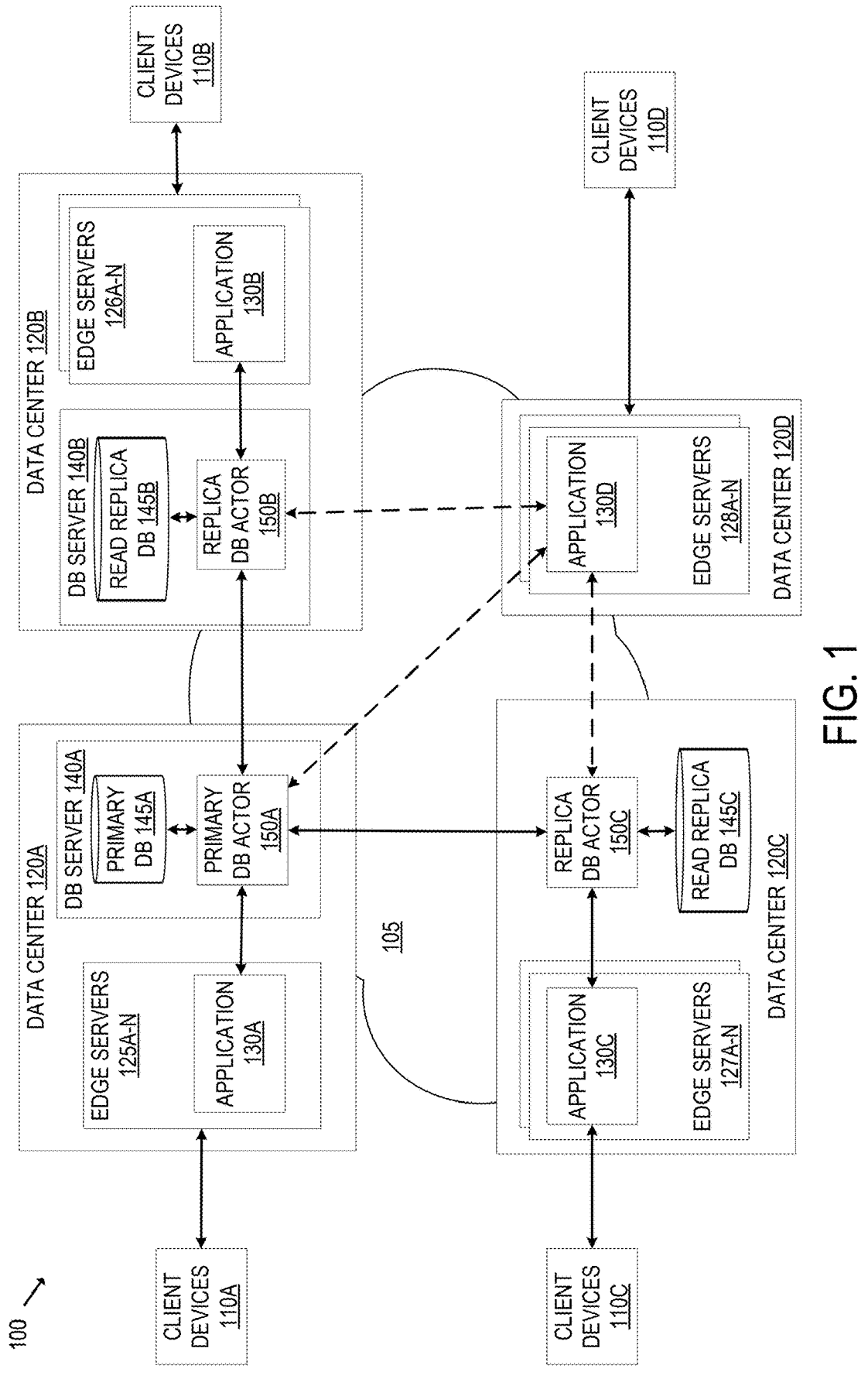
FIG. 1 illustrates an exemplary distributed cloud computing network with sequential database consistency according to an embodiment.

FIG. 1 illustrates an exemplary distributed cloud computing network with sequential database consistency according to an embodiment. The system 100 includes the client devices 110A-D and the data centers 120A-D. Each client device is a computing device (e.g., laptop, workstation, smartphone, mobile phone, tablet, gaming system, set top box, wearable device, Internet of Things (IoT) device, etc.) that can transmit and/or receive network traffic. Each client device may execute a client network application such as a web browser, native application, or other application that can access network resources (e.g., web pages, images, word processing documents, PDF files, movie files, music files, or other computer files).

The data centers 120A-D are part of the distributed cloud computing network 105. The data centers 120A-D are geographically distributed (e.g., in different locations throughout the world). Each data center can include one or more compute servers, one or more control servers, one or more DNS servers, and other pieces of network equipment such as router(s), switch(es), and/or hub(s). For example, the data center 120A includes the edge servers 125A-N and the database server 140A, the data center 120B includes the edge servers 126A-N, and the database server 140B, the data center 120C includes the edge servers 127A-N and the database server 140C, and the data center 120D includes the edge servers 128A-N. The number of data centers shown in FIG. 1 is exemplary; there may be more data centers or less data centers.

Network traffic is received at the distributed cloud computing network 105 from client devices such as the client devices 110A-D. The traffic may be received at the distributed cloud computing network 105 in different ways. For instance, IP address(es) of an origin network belonging to the customer may be advertised (e.g., using Border Gateway Protocol (BGP)) by the distributed cloud computing network 105 instead of being advertised by the origin network. As another example, the datacenters of the distributed cloud computing network 105 may advertise a different set of anycast IP address(es) on behalf of the origin and map those anycast IP address(es) to the origin IP address(es). This causes IP traffic to be received at the distributed cloud computing network 105 instead of being received at the origin network. As another example, network traffic for a hostname of the origin network may be received at the distributed cloud computing network 105 due to a DNS request for the hostname resolving to an IP address of the distributed cloud computing network 105 instead of resolving to an IP address of the origin network. As another example, client devices may be configured to transmit traffic to the distributed cloud computing network. For example, an agent on the client device (e.g., a VPN client) may be configured to transmit traffic to the distributed cloud computing network 105. As another example, a browser extension or file can cause the traffic to be transmitted to the distributed cloud computing network 105.

In any of the above examples, the network traffic from a client device may be received at a particular data center that is determined to be closest to the client device in terms of routing protocol configuration (e.g., Border Gateway Protocol (BGP) configuration) according to an anycast implementation as determined by the network infrastructure (e.g., router(s), switch(es), and/or other network equipment between the client device and the datacenters or by a geographical load balancer. As illustrated in FIG. 1, the client devices 110A-D may be closest to the data centers 120A-D, respectively. Since the datacenters 120A-D are geographically distributed, the distance between requesting client devices and the edge servers is decreased. This decreases the time to respond to a request. An edge server within a datacenter that receives the initial request may terminate the TLS connection with the requesting computing device.

The received network traffic can trigger the execution of code at an edge server. The code can also be triggered by other trigger events such as a predefined scheduled time, an alarm condition being met, an external event such as a receipt of an email, text message, or other electronic communication, and a message being sent to a queue system. These trigger events are examples and there may be other events or data that trigger the execution of code at the compute server. The code may be third-party code written or deployed by a customer of the distributed cloud computing network and/or first-party code written or deployed by the provider of the distributed cloud computing network. The code may include one or more functions. The code may be part of a serverless application. The code can be, for example, a piece of JavaScript or other interpreted language, a WebAssembly (WASM) compiled piece of code, or other compiled code. In an embodiment, the code is compliant with the W3C standard ServiceWorker API. The code is typically executed in a runtime at an edge server and is not part of a webpage or other asset of a third-party. The code is sometimes referred to as application code or simply an application.

In the example here, the application can read and/or write to a database that is provided by the distributed cloud computing network 105. Instances of the application can execute on multiple edge servers. As shown in FIG. 1, an application instance 130A is executing on the edge servers 125A-N, an application instance 130B is executing on the edge servers 126A-N, an application instance 130C is executing on the edge servers 127A-N, and an application instance 130D is executing on the edge servers 128A-N.

A customer's serverless database includes at least one primary database and a set of one or more read replica databases. As shown in FIG. 1, the data center 120A includes the primary database 145A, and the data centers 120B and 120C include the read replica databases 145B and 145C respectively. The data center 120D does not include a read replica database. Although FIG. 1 shows an example where not all data centers include a read replica database, each data center may include one or more read replica databases in some implementations. Although FIG. 1 shows the database servers separate from the edge servers, in some implementations, a database server is implemented on the same physical hardware as an edge server.

When making a database call, the application is typically routed to the closest implementation of the database. For example, if the application that is executing is closest to the primary database, the application will be routed to the primary database. If the application is closest to a replica database, the application will be routed to that replica database. In one embodiment, however, each database call of the application is routed to a replica database, and the choice of which replica may be based on the location of the user agent and/or the loads on the replica database.

The application communicates with the database using a piece of code that interacts with the database and enforces the sequential consistency. This piece of code is referred to as a database actor. A particular database actor includes a combination of a piece of code and persistent data that belongs to the instantiation of the piece of code. In an embodiment, the piece of code is written using standard Web Platform APIs such as Fetch API for handling HTTP requests. A database actor locks the data such that it is the sole owner of the data while it is being executed. Other entities that wish to interact with the data send messages to the database actor that owns the data. In an embodiment, each instantiated actor script is run in an isolated execution environment, such as run in an isolate of the V8 JavaScript engine. The isolated execution environment can be run within a single process. In an embodiment, the instantiated actor scripts are not executed using a virtual machine or a container. In an embodiment, a particular actor script is loaded and executed on-demand (when and only if it is needed) at a particular compute server of the distributed cloud computing network.

For a particular database, there is a primary database actor that interacts with the primary database, and a set of one or more replica database actors that interact with the one or more replica databases, respectively. The primary database actor controls writing to the primary database. The use of the term "write operation" or the like refers to any mutation of the database. Examples for a Structured Query Language (SQL) database includes an INSERT operation, an UPDATE operation, a DELETE operation, and other SQL data definition language (DDL) commands that modify the database schema. A replica database actor controls reading from a particular replica database. In the example of FIG. 1, the primary database actor 150A controls reading from and writing to the primary database 145A. The replica database actor 150B controls reading from the read replica database 145B, and the replica database actor 150C controls reading from the read replica database 145C.

Thus, all write queries go to the primary database actor. A write query can be received directly from an application or from a replica database actor. The primary database actor sends confirmed writes to the replica database actor(s) so that those replica database actor(s) can replay the writes. The primary database actor also sends comment tokens to the replica database actor(s). A particular commit token identifies a particular committed query. A read operation can be performed directly by a replica database actor. A replica database actor will pause execution of a read operation if the request includes a commit token that is greater than the latest commit token of the read replica database, until it receives an update from the primary database actor with a commit token later than or equal to the commit token included in the request.

The commit token can be put into an HTTP response header (e.g., Set-Cookie header). The commit token may be versioned such that different versions of the database can be used. The commit token may be tamper-resistant such that clients cannot submit a false commit token. The commit token may be obfuscated such that information is not leaked to users. As an example, a commit token can take the form Version: Instance: Sequence, where Version is the version number, Instance the instance number of the database (incremented every time the primary database is started on a new DB Server), and Sequence is a counter of the number of committed writes that have occurred in the current Instance of the database. As another example, a commit token can take the form of Instance-Frame-Day-Signature, where Instance is the instance number of the last frame committed, Frame is the frame number of the last frame committed, Day is the day number on which the token is made, and Signature is a signature based on the object's encryption key.

FIG. 2 is a flow diagram that illustrates exemplary operations for providing sequential consistency across a distributed cloud computing network according to an embodiment. The operations of FIG. 2 and the other flow diagrams are described with respect to the exemplary embodiment of FIG. 1. However, the operations of FIG. 2 and the other flow diagrams can be performed by different embodiments from that of FIG. 1, and the embodiment of FIG. 1 can perform operations different from that of FIG. 2 and the other flow diagrams.

At operation 210, a request from a client is received at a server of the distributed cloud computing network 105. The request includes a requested database operation (e.g., a read or a write) to a database. The request may be an HTTP request, HTTPS request, or other protocol request. In the example of FIG. 1, the request triggers execution of an application executing on the edge server. The distributed cloud computing network 105 includes multiple edge servers that are geographically distributed, and there may be hundreds or more edge servers. In an embodiment, the distributed cloud computing network uses anycast such that a particular group of edge servers (e.g., connected to the same router of a data center) receives a request because it is the closest to the requesting client device according to an anycast implementation. Which of the group of edge servers processes the request may be determined by the router that receives the request (e.g., according to an equal cost multipath routing mechanism). Thus, the edge server that receives the request in operation 210 may receive it because that edge server is part of a group of servers that is the closest to the client device making the request as determined by an anycast implementation.

Next, at operation 212, the application transmits the request to a database actor to service the requested database operation. The transmitted request also includes any commit token included in the request. In an embodiment, the application always transmits the request to a replica database actor for servicing. In such an embodiment, if there are multiple replica database actors, the particular database actor that receives the request is based on the location of the user agent (the client requesting the operation) and/or the loads on the replica databases. In another embodiment, the application transmits the request to a primary database directly or any of the replica databases (e.g., based on location of the user agent and/or the loads on the databases). In the example of FIG. 2, the application transmits the request to a replica database actor (e.g., the replica database actor 150C).

Next, at operation 215, the replica database actor 150C that receives the request determines the type of database operation that is being requested. The type of database operation is determined by parsing the queries and determining whether it is a read query or a write query. If the database operation is a write operation, then operation 220 is performed. If the database operation is a read operation, then operation 235 is performed.

Figure 4:
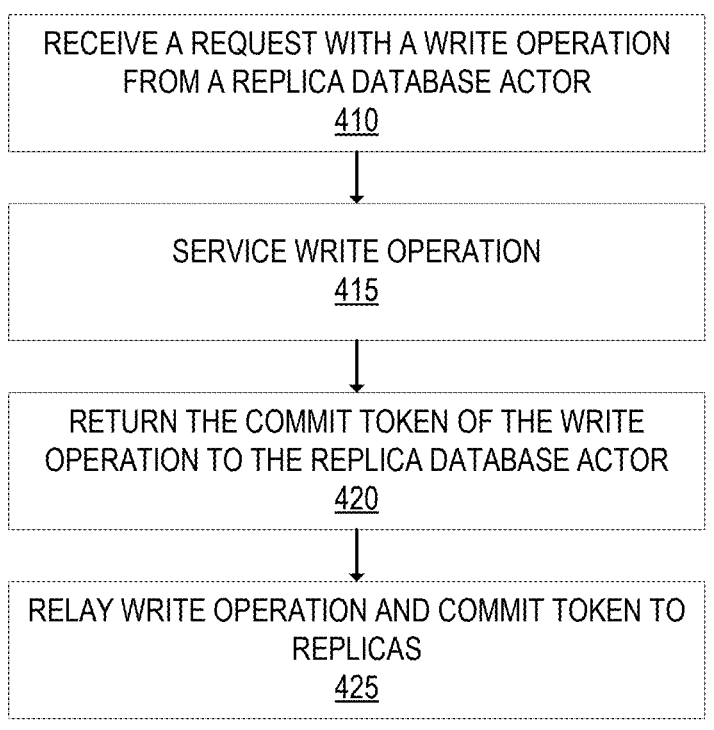
FIG. 4 is a flow diagram that illustrates exemplary operations for a primary database servicing a write request according to an embodiment.

At operation 220 (a write operation is being requested), the replica database actor 150C transmits the request with the write operation to the primary database actor 150A. Any read operation for the session while the write operation is pending may be delayed until the replica database actor 150C receives confirmation that the write operation has succeeded and the information replicated to the read replica database 145C. FIG. 4 is a flow diagram that illustrates exemplary operations for a primary database servicing a write request according to an embodiment. At operation 410, the primary database actor 150A receives a request with a write operation from the replica database actor 150C. Next, at operation 415, the primary database actor 150A services the write operation including writing the data to the primary database 145A. Next, at operation 420, the primary database actor 150A returns the commit token of the write operation to the replica database actor 150C. Next, at operation 425, the primary database actor 150A relays the write operation and the commit token for the write operation to the replica database actors 150B and 150C.

Referring back to FIG. 2, at operation 225, the replica database actor 150C receives a response from the primary database actor 150A that includes a result of the write operation and includes a commit token representing the latest commit of the primary database 145A. Next, at operation 230, the replica database actor 150C causes the response, including the commit token, to be transmitted to the client.

Figure 3:
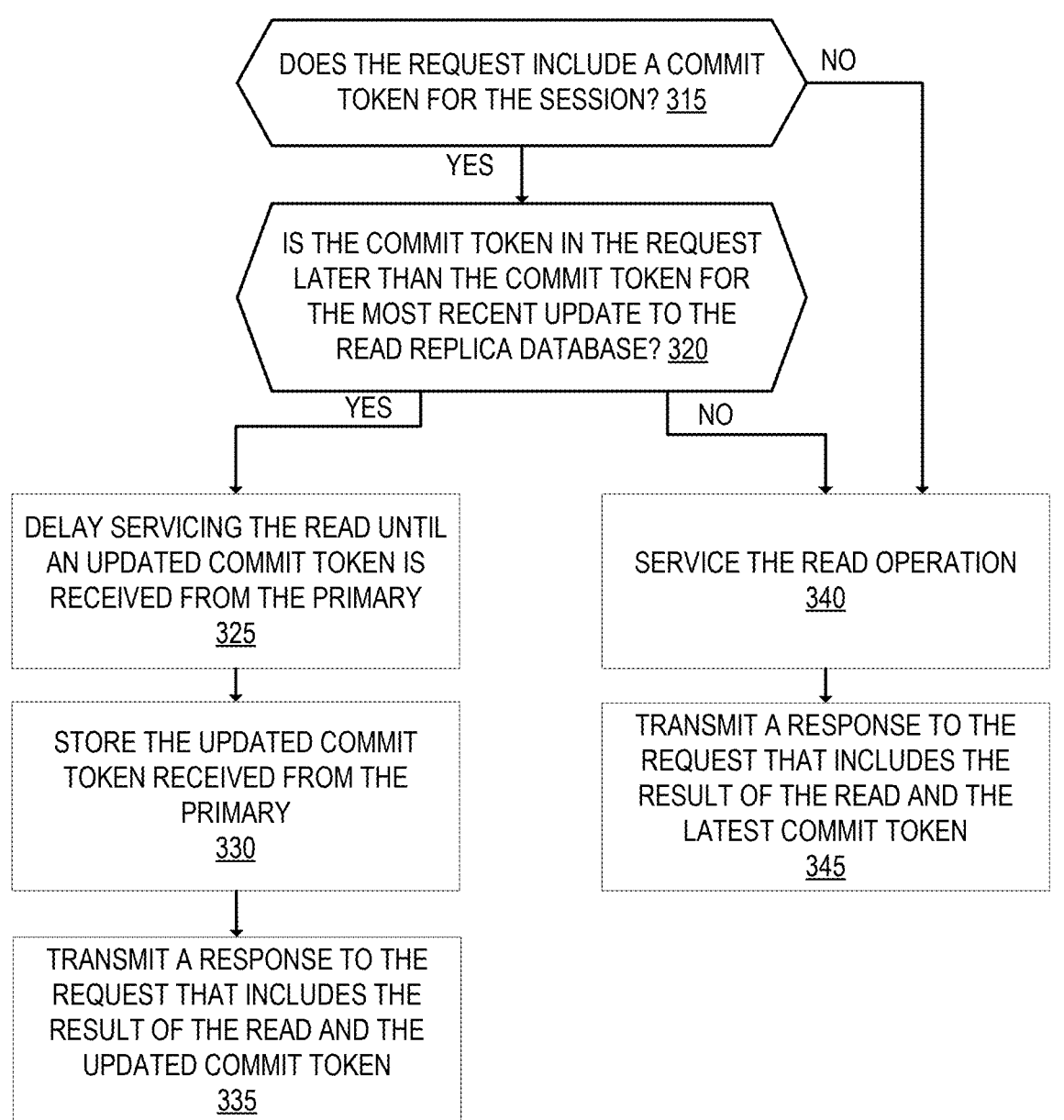
FIG. 3 is a flow diagram that illustrates exemplary operations for a read replica servicing a read operation according to an embodiment.

At operation 235 (a read operation is being requested), the replica database actor 150C services the read operation at the read replica database 145C. FIG. 3 is a flow diagram that illustrates exemplary operations for a read replica servicing a read operation according to an embodiment. At operation 315, the replica database actor 150C determines whether the request includes a commit token for the session. The commit token may be included in a cookie in the request or from device-local storage. If the request includes a commit token for the session, then operation 320 is performed. If the request does not include a commit token for the session, then operation 340 is performed.

At operation 320, the replica database actor 150C determines whether the commit token in the request is later than the commit token for the most recent update of the read replica database 145C. If a commit token in the request is later than the commit token for the most recent update of the read replica database 145C, then this means that the read replica database 145C may not be sequentially consistent. To address this, at operation 325, the replica database actor 150C pauses execution before servicing the read operation until a database update with an updated commit token is received from the primary database actor 150A. When the replica database actor 150C receives such an update, it services the read operation. Receiving an updated commit token should take on the order of milliseconds or seconds depending on the implementation. Next, at operation 330, the replica database actor 150C stores the updated commit token received from the primary database actor 150A. Next, at operation 335, the replica database actor 150C transmits a response to the request that includes the result of the read and the updated commit token (e.g., back to the requesting application).

If the commit token included in the request is equal or smaller than the commit token for the most recent update of the read replica database 145C, then the replica database actor 150C services the read operation at operation 340 without delay. Next, at operation 345, the replica database actor 150C transmits a response to the request that includes the result of the read and the updated commit token (e.g., back to the requesting application). Referring back to FIG. 2, at operation 240, the replica database actor 150C causes the response to be transmitted to the client including the commit token.

FIG. 3 shows an embodiment where if the request does not include a commit token for the session (e.g., it is the first request in the session), then the read operation is served by a read replica database. In another embodiment, if the request does not include a commit token for the session, the read operation is served by the primary database. In such an embodiment, the primary database performs the read operation and returns the result including the latest commit token to the read replica database. The commit token is then transmitted to the client. In an embodiment, the customer can configure their application regarding whether a first request in the session is to be served by the primary database or whether it can be served by a read replica database.

Figure 5:
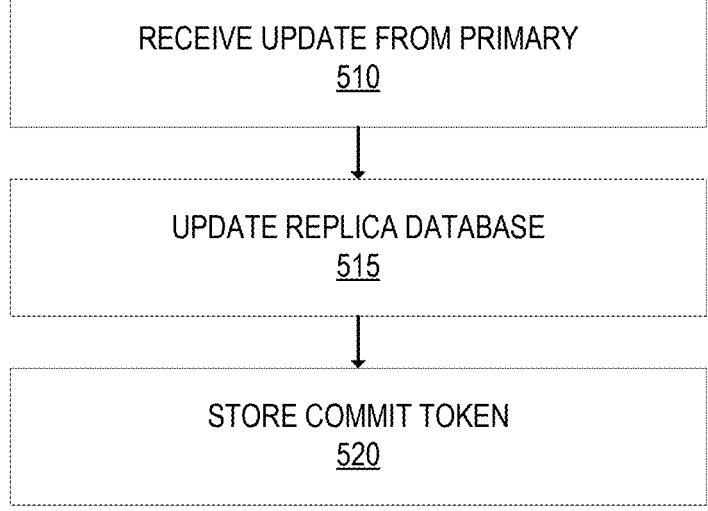
FIG. 5 is a flow diagram that illustrates exemplary operations for a read replica database receiving an update from a primary database according to an embodiment.

FIG. 5 is a flow diagram that illustrates exemplary operations for a read replica database receiving an update from a primary database according to an embodiment. At operation 510, a read replica database receives an update from the primary database. For example, the replica database actor 150C receives an update from the primary database actor 150A. The update includes a commit token representing the latest commit to the primary database. Next, at operation 515, the read replica database updates its database and at operation 520, the read replica database stores the commit token. For example, the replica database actor 150C updates the read replica database 145C and stores the commit token for later use.

Figure 6:
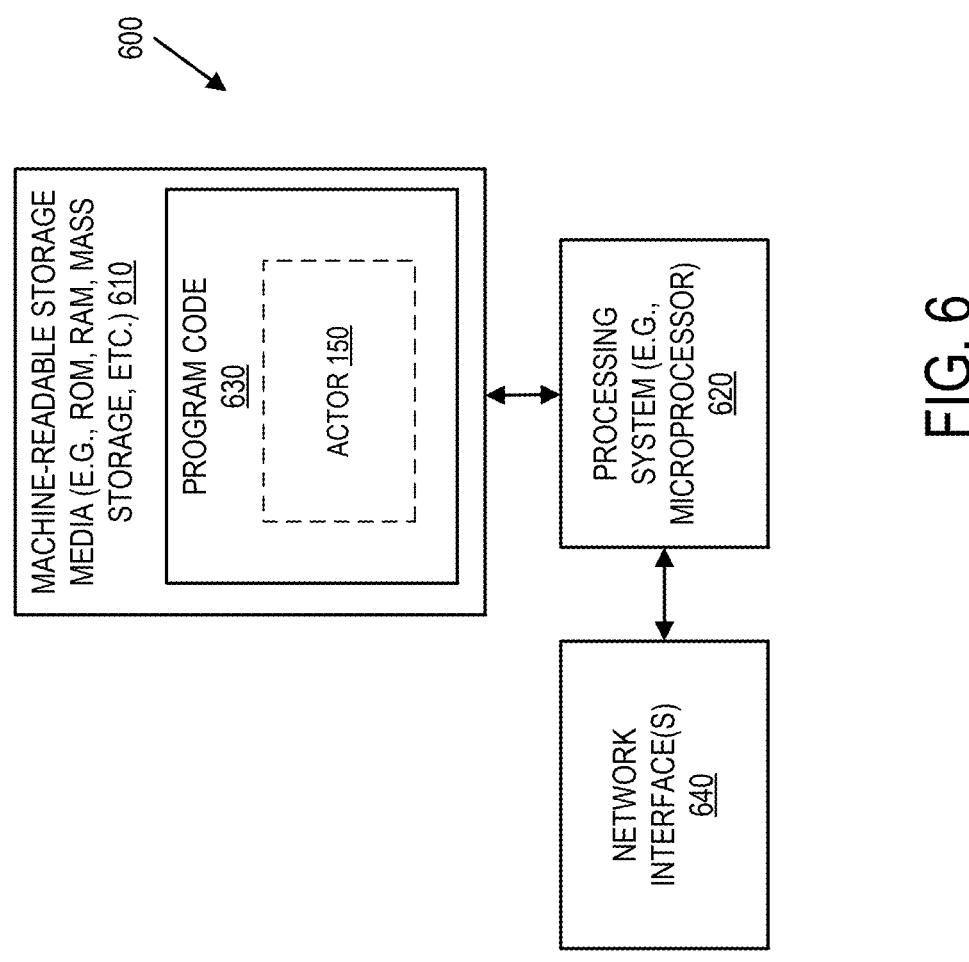
FIG. 6 is a block diagram illustrating a data processing system that can be used in an embodiment.

FIG. 6 illustrates a block diagram for an exemplary data processing system 600 that may be used in some embodiments. One or more such data processing systems 600 may be utilized to implement the embodiments and operations described with respect to the compute servers and/or client devices. Data processing system 600 includes a processing system 620 (e.g., one or more processors and connected system components such as multiple connected chips).

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620. For example, the depicted machine-readable storage media 610 may store program code 630 that, when executed by the processing system 620, causes the data processing system 600 to execute an actor 150, and/or any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). Additional components, not shown, may also be part of the system 600, and, in certain embodiments, fewer components than that shown in One or more buses may be used to interconnect the various components shown in FIG. 6.

The techniques shown in the figures can be implemented using code and data stored and executed on one or more electronic devices (e.g., a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth. However, it is understood that embodiments may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for providing sequential consistency across a distributed cloud computing network, comprising:

receiving a first request that includes a first read operation of a database that includes a primary database and a plurality of read replica databases, wherein the plurality of read replica databases are distributed by the distributed cloud computing network, and wherein the plurality of read replica databases are read replicas of the primary database, and wherein the first request is part of a logical session;

determining that the first request does not include a first token that identifies a first particular committed query to a first read replica database that is later than a second token that is stored that identifies a first latest committed query to the first read replica database, and responsive to this determination:

transmitting the first request to the primary database for servicing, receiving a first response to the first request that includes a first result of the first read operation and a third token, updating the first read replica database with the first result and storing the third token that identifies a second latest committed query, and transmitting a second response to the first request that includes the first result of the first read operation and the third token;

receiving a second request that includes a second read operation of the database, wherein the second request is part of the logical session;

determining that the second request includes a fourth token that identifies a third particular committed query to the first read replica database that is later than the third token that is stored that identifies the second latest committed query to the first read replica database, and responsive to this determination:

pausing execution of the second read operation until the first read replica database is updated from the primary database with a fifth token that is later or equal to the fourth token;

receiving, from the primary database, an update from the primary database with the fifth token;

updating the first read replica database with the update from the primary database, and storing the fifth token;

performing the second read operation;

transmitting a third response to the second request that includes a third result of the second read operation, and the fifth token;

receiving a third request that includes a write operation, wherein the third request is part of the logical session;

transmitting the third request to the primary database for servicing;

receiving a fourth response to the third request that includes a fourth result of the write operation and a sixth token; and transmitting the fourth response to the third request.

2. The method of claim 1, wherein the first token, second token, third token, fourth token, fifth token, and sixth token, are each a monotonically increasing commit token.

3. The method of claim 1, wherein the fourth token is included in a cookie or accessed from device-local storage.

4. The method of claim 1, wherein the fourth token indicates a version.

5. The method of claim 1, wherein all write operations are transmitted to the primary database for servicing.

6. The method of claim 1, further comprising:

receiving an update from the primary database that includes a seventh token that represents a latest commit of the primary database; and updating the first read replica database with the update from the primary database, and storing the seventh token.

7. The method of claim 1, wherein the logical session is unique to a particular user agent.

8. A server of a plurality of servers of a distributed cloud computing network, the server comprising:

a processor; and a non-transitory machine-readable storage medium coupled to the processor that stores instructions that, when executed by the processor, causes the server to perform operations including:

receiving a first request that includes a first read operation of a database that includes a primary database and a plurality of read replica databases, wherein the plurality of read replica databases are distributed by the distributed cloud computing network, and wherein the plurality of read replica databases are read replicas of the primary database, and wherein the first request is part of a logical session;

determining that the first request does not include a first token that identifies a first particular committed query to a first read replica database that is later than a second token that is stored that identifies a first latest committed query to the first read replica database, and responsive to this determination:

transmitting the first request to the primary database for servicing, receiving a first response to the first request that includes a first result of the first read operation and a third token, updating the first read replica database with the first result and storing the third token that identifies a second latest committed query, and transmitting a second response to the first request that includes the first result of the first read operation and the third token;

receiving a second request that includes a second read operation of the database, wherein the second request is part of the logical session;

determining that the second request includes a fourth token that identifies a third particular committed query to the first read replica database that is later than the third token that is stored that identifies the second latest committed query to the first read replica database, and responsive to this determination:

pausing execution of the second read operation until the first read replica database is updated from the primary database with a fifth token that is later or equal to the fourth token;

receiving, from the primary database, an update from the primary database with the fifth token;

updating the first read replica database with the update from the primary database, and storing the fifth token;

performing the second read operation;

transmitting a third response to the second request that includes a third result of the second read operation, and the fifth token;

receiving a third request that includes a write operation, wherein the third request is part of the logical session;

transmitting the third request to the primary database for servicing;

receiving a fourth response to the third request that includes a fourth result of the write operation and a sixth token; and transmitting the fourth response to the third request.

9. The server of claim 8, wherein the first token, second token, third token, fourth token, fifth token, and sixth token, are each a monotonically increasing commit token.

10. The server of claim 8, wherein the fourth token is included in a cookie or accessed from device-local storage.

11. The server of claim 8, wherein the fourth token indicates a version.

12. The server of claim 8, wherein all write operations are transmitted to the primary database for servicing.

13. The server of claim 8, wherein the operations further comprise:

receiving an update from the primary database that includes a seventh token that represents a latest commit of the primary database; and updating the first read replica database with the update from the primary database, and storing the seventh token.

14. The server of claim 8, wherein the logical session is unique to a particular user agent.

15. A non-transitory machine-readable storage medium that provides instructions that, when executed by a processor causes operations to be performed including:

receiving a first request that includes a first read operation of a database that includes a primary database and a plurality of read replica databases, wherein the plurality of read replica databases are distributed by a distributed cloud computing network, and wherein the plurality of read replica databases are read replicas of the primary database, and wherein the first request is part of a logical session;

determining that the first request does not include a first token that identifies a first particular committed query to a first read replica database that is later than a second token that is stored that identifies a first latest committed query to the first read replica database, and responsive to this determination:

transmitting the first request to the primary database for servicing, receiving a first response to the first request that includes a first result of the first read operation and a third token, updating the first read replica database with the first result and storing the third token that identifies a second latest committed query, and transmitting a second response to the first request that includes the first result of the first read operation and the third token;

receiving a second request that includes a second read operation of the database, wherein the second request is part of the logical session;

determining that the second request includes a fourth token that identifies a third particular committed query to the first read replica database that is later than the third token that is stored that identifies the second latest committed query to the first read replica database, and responsive to this determination:

pausing execution of the second read operation until the first read replica database is updated from the primary database with a fifth token that is later or equal to the fourth token;

receiving, from the primary database, an update from the primary database with the fifth token;

updating the first read replica database with the update from the primary database, and storing the fifth token;

performing the second read operation;

transmitting a third response to the second request that includes a third result of the second read operation, and the fifth token;

receiving a third request that includes a write operation, wherein the third request is part of the logical session;

transmitting the third request to the primary database for servicing;

receiving a fourth response to the third request that includes a fourth result of the write operation and a sixth token; and transmitting the fourth response to the third request.

16. The non-transitory machine-readable storage medium of claim 15, wherein the first token, second token, third token, fourth token, fifth token, and sixth token, are each a monotonically increasing commit token.

17. The non-transitory machine-readable storage medium of claim 15, wherein the fourth token is included in a cookie or accessed from device-local storage.

18. The non-transitory machine-readable storage medium of claim 15, wherein the fourth token indicates a version.

19. The non-transitory machine-readable storage medium of claim 15, wherein all write operations are transmitted to the primary database for servicing.

20. The non-transitory machine-readable storage medium of claim 15, wherein the operations further comprise:

receiving an update from the primary database that includes a seventh token that represents a latest commit of the primary database; and updating the first read replica database with the update from the primary database, and storing the seventh token.

* * * * *